United States Patent [19]

Narusawa et al.

[11] Patent Number: 4,766,504
[45] Date of Patent: Aug. 23, 1988

[54] VIDEO DISK AND RECORDER WITH TIME RECORDED TWICE

[75] Inventors: Toshio Narusawa; Ryoji Higashi, both of Yamanashi, Japan

[73] Assignees: Pioneer Electronic Corporation, Tokyo; Pioneer Video Corporation, Yamanashi, both of Japan

[21] Appl. No.: 882,002

[22] Filed: Jul. 3, 1986

[30] Foreign Application Priority Data

Jul. 4, 1985 [JP] Japan .................................. 60-146985

[51] Int. Cl.$^4$ ............................................. H04N 5/91
[52] U.S. Cl. ...................................... 358/337; 358/343
[58] Field of Search ................... 360/14.2, 14.3, 33.1, 360/19.1; 369/40, 49, 50; 358/311, 320, 341, 343, 335, 310, 337

[56] References Cited

U.S. PATENT DOCUMENTS

| 4,503,470 | 3/1985 | Mita et al. ........................ 360/14.3 |
| 4,532,557 | 7/1985 | Larkins ............................. 360/33.1 |
| 4,604,657 | 8/1986 | Fukami et al. ..................... 360/14.3 |

Primary Examiner—Donald McElheny, Jr.
Attorney, Agent, or Firm—Sughrue, Mion, Zinn, Macpeak & Seas

[57] ABSTRACT

A system for recording by frequency-division and time multiplex a television signal divided into frames and a digital data signal divided into blocks. The time durations of the blocks and frames are not evenly divisible but times, for instance seconds, which approximately are different fixed multiples of the number of counted frames and blocks, are recorded together with the counted frames and blocks. The frame time is incremented after a fixed number of frames is counted. The block time is incremented in the block following the incrementing of the frame time.

4 Claims, 2 Drawing Sheets

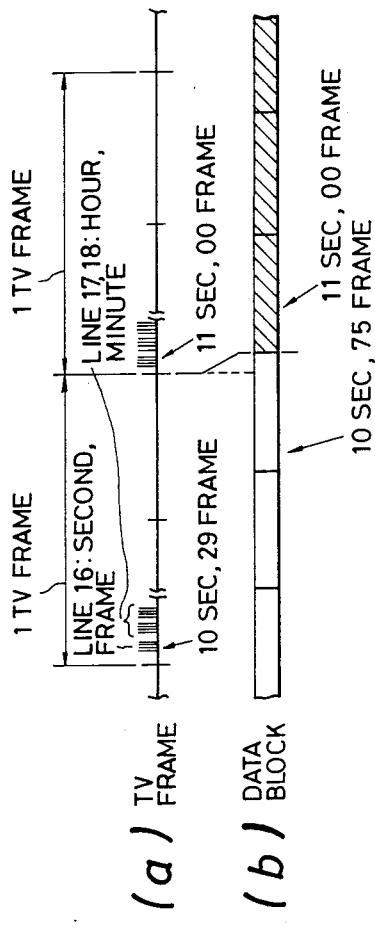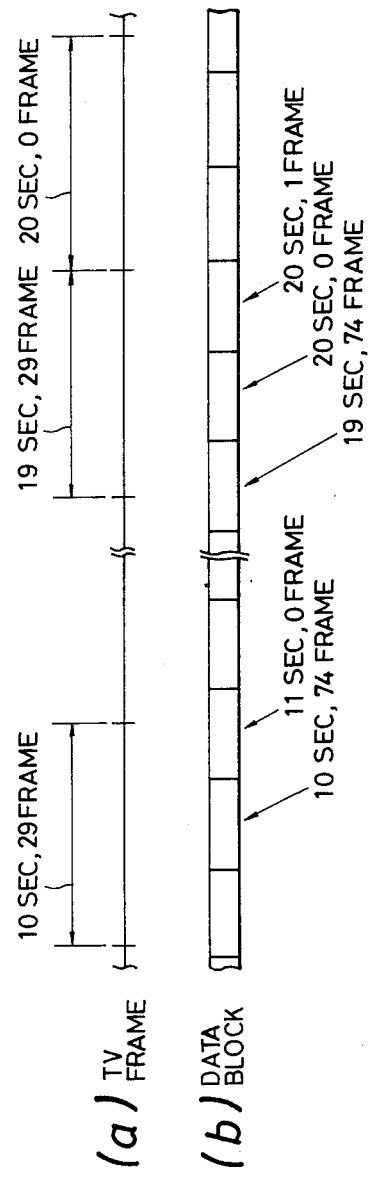

VIDEO DISK AND RECORDER WITH TIME RECORDED TWICE

BACKGROUND OF THE INVENTION

This invention relates to a video disk and its recorder for recording television video signals.

Disks for dense data recording have recently been developed and commercialized. Video disks and digital audio disks are typical of these dense recording disks. In the case of an optical video through the frequency modulation of a carrier wave at 8.1 MHz the sync chip level and the white level may respectively be at 7.6 MHz and 9.3 MHz, whereas accompanying audio signals such as bilateral stereo and bilingual signals are recorded through the frequency modulation of carrier waves at 2.3 MHz and 2.8 MHz. On the other hand, the spectrum of the EFM signal of a PCM bilateral stereo audio signal in an optical digital audio disk is seen to occupy frequency bands at about 2 MHz or lower. Since the frequency bands at 2 MHz or lower are mostly vacant, such an EFM signal can be recorded on video disks through multiplex frequency division.

In such video and digital audio disks, time codes (representing MIN, SEC, FRAME, etc.) as an absolute address are recorded on a frame (block) basis. In the case of, for instance, the video disk, the time code is incremented by one second every 30 frames from the beginning of a program because the frequency of the frame is 29.97 Hz (for the NTSC system) and frame numbers are allotted to the frames numbered 0 through 29 within the same second. In other words, as shown in FIG. 4(a), the frame 10 sec 29 is followed by the frame 11 sec 0 and then the frame 11 sec 1.

In the digital audio disk, time codes are recorded on a 75 Hz block (frame) basis. In this case, 75 blocks become equal to one second and therefore the time code is incremented by one second every 75 blocks and frame numbers 0 through 74 are further allotted to the blocks (frames) within the same second. In other words, as shown in FIG. 4(b), the frame 10 sec 74 is followed by the frame 11 sec 0 and then the frame 11 sec 1.

Since the frequency of the block of the digital data in a audio disk is exactly 75 Hz, the time code coincides with real time. In other words, precisely one second elapses when data of 75 blocks are played back. On the contrary, the time code in a video disk will not precisely coincide with real time because the frequency of the frame of the video signal is 29.97 Hz, i.e., an error of about 3.6 seconds will be produced per hour of real time. As such an error is insignificant, when only a video signal is recorded on the video disk, there is no particular problem even though the time code of the video signal is used for retrieval. However, if a digital data signal superposed on the video signal is continuously recorded on the video disk and each of the two signals is recorded with its own time code, the position retrieved from the time code of the digital data signal will differ from what is retrieved from the time code of the video signal, thus impeding its practicality.

SUMMARY OF THE INVENTION

In the video disk according to the present invention, television video and digital data signals are subjected to frequency division and multiplex recording. The digital data signal is divided into blocks, each being shorter than a corresponding frame of the video signal but asynchronous with the frame in length. A time code is recorded in each frame and each block. One second of the time code of either frame or block is incremented in a frame or block starting after one second of the time code of the other is incremented. During recording, the number of frames of the video signal and the number of blocks of the digital data signal are counted so that the time codes of the frame and the block may respectively be generated according to each value counted. After one second of the value counted for either frame or block is incremented, one second of the value counted for the other is incremented when the value of a new frame or block is counted. Thus, the value counted for one controls the value counted for the other, so that the same position is retrieved irrespective of the retrieval of the time code of either video or digital data signal.

BRIEF DESCRIPTION OF THE DRAWINGS

FIGS. 3(a) and 3(b) are partially enlarged views of FIG. 2.

FIGS. 4(a) and 4(b) are diagrams illustrating the typical relation between the time codes of conventional video and digital data signals.

DETAILED DESCRIPTION OF THE PREFERRED EMBODIMENTS

Figure 1:
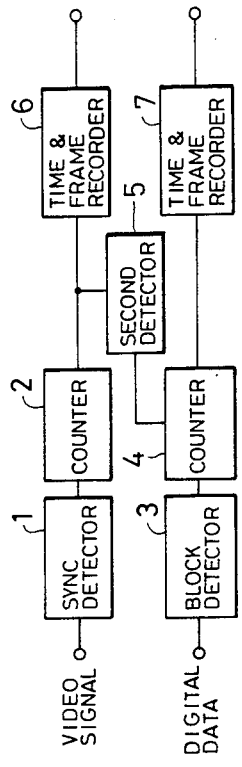
FIG. 1 is a block diagram of a recorder embodying the present invention.

FIG. 1 is a block diagram of a recorder embodying the present invention, wherein the recorder comprises a detection circuit 1 for detecting a vertical synchronizing signal in a received video signal and producing a detection signal once per frame (i.e., every time the vertical synchronizing signal is detected twice). A synchronization counter 2 counts the output signal of the detection circuit 1 and produces the value counted, a time code of the video signal being generated according to the value counted by the counter 2. A detection circuit 3 detects a block of the digital data signal received and supplies the detection signal to a block counter 4, which counts the output of the detection circuit 3 and causes the generation of a code of the digital signal corresponding to the value counted thereby. A detection circuit 5 detects a signal corresponding to a one-second interval from the value counted by the synchronization counter 2 and controls the block counter 4 by sending it a control signal when the second value is incremented by one. A time and frame recorder 6 records in multiplex form the time and frame number of the video frame in the frequency modulation of the video carrier. A time and frame recorder 7 performs similar recording of the time and frame number of the blocks of the digital data carrier.

The operation of the recorder will subsequently be described. Video and digital data signals to be recorded on a video disk are supplied to the synchronization and block detection circuits 1 and 3. The synchronization detection circuit 1 detects a vertical synchronizing signal in the video signal and produces a detection signal once per two detections of the vertical synchronizing signal. Accordingly, the synchronization detection circuit 1 is so operated as to detect video frames. As the synchronization counter 2 counts the output signal of the detection circuit 1, the number of frames is thereby counted. Since the counting operation is continuously conducted from the beginning of a program, the time code of the video signal resulting from the value counted by the synchronization counter 2 is generated. In other words, every time one frame is counted, one frame is incremented and, when 30 frames are counted, one second is incremented. In the same manner, one minute is incremented every 60 seconds and one hour is incremented every 60 minutes, respectively. The hour, minutes, second and the number of frames within one and same second are thus displayed. The time code causes, as shown in FIG. 3, e.g., data of the second and the frame to be recorded in the 16th H (H=horizontal scanning period) of the video signal and data of the hour and the minute to be respectively recorded in the 17th H and 18th H of the video signal.

On the other hand, the block detection circuit 3 detects the block of the digital data signal and the block counter 4 counts the number of blocks, so that the time code of the digital data signal resulting from the counted value is generated.

The second detection circuit 5 is so operated as to detect the value equivalent to the one-second period in the values counted by the synchronization counter 2. When one second of the time code of the video signal is incremented, the second detection circuit supplies the control signal to the block counter 4. On receiving a new detection signal from the block detection circuit 3 after the control signal is supplied by the second detection circuit 5, the block counter 4 increments the value of the time code of the digital data signal by one second.

Figure 2:
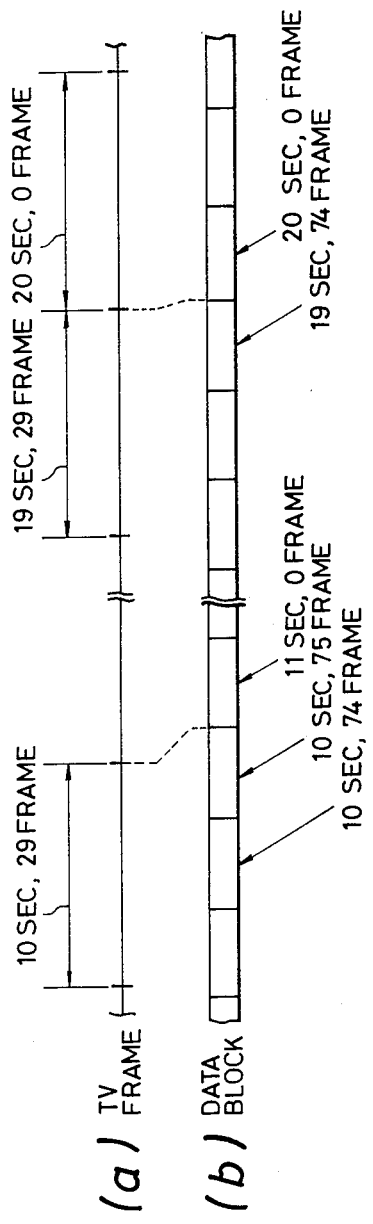
FIGS. 2(a) and (b) are diagrams illustrating the typical relation between the time codes of video and digital data signals.

When the next detection signal is produced by the block detection circuit 3 after the block counter 4 counts the frame 10 sec 74, as shown in FIG. 2, it is equivalent to the start of the 11th sec block in real time. However, the video signal is still within the frame 10 sec 29 and no second increment has been executed. Consequently, the block counter 4 will not increment the second value but instead increments one frame and produces the time code of the frame 10 sec 75. The synchronization counter 2 increments the second value in the next frame upon completion of the time code of the frame 10 sec 29 of the video signal and produces the time code of the frame 11 sec 0. The second detection circuit 5 detects the increment of the second value and produces the control signal. Thereby the block counter 4 increments one second when the block detection circuit 3 produces the detection signal and the time code of the frame 11 sec 0.

When the synchronization counter 2 produces the time code of the frame 20 sec 0 following the time code of the frame 19 sec 29, the subsequent block corresponds to the frame 20 sec 0 because the block counter 4 maintains the time code of the frame 19 sec 74. This means there are cases where up to 75 (0 through 74) frames are generated and also cases where 76 (0 through 75) frames per second are generated with the time code of the digital data signal.

The number of blocks (frames) is thus incremented by one every time one block is counted and, when 75 or 76 frames (blocks) are counted, one second is incremented. In the same manner, one minute every 60 seconds and one hour every 60 minutes are incremented, whereby the hour, minute, second and the number of frames (blocks) within one and the same second are displayed.

In consequence, although the time codes of both video and digital data signal will not precisely coincide with real time (however, practically posing no problem since the difference therebetween is extremely small), the difference therebetween is within a range of one block and the same position is retrieved even though either time code is designated in unit terms and retrieved.

Although an increment of one second is arranged for the digital data signal after an increment of one second for the video signal, this order may be reversed, i.e., an increment of one second is arranged for the video signal after an increment of one second for the digital data signal.

As set forth above, in the video disk according to the present invention wherein television video and digital data signals are subjected to frequency division and multiplex recording, the digital data signal is divided into blocks, each being shorter than a corresponding frame of the video signal but asynchronous with the frame in length. A time code is recorded in each frame and each block, wherein one second of the time code of either frame or block is incremented in a frame or block starting after one second of the time code of the other is incremented. In the recording of the data blocks, the number of the frame of the video signal and the number of blocks of the digital data signal are counted so that the time codes of the frame and the block may respectively be generated according to each value counted. After one second of the value counted of either frame or block is incremented, one second of the value counted of the other is incremented when the value of a new frame or block is counted in order to employ the value counted of one for controlling the value counted of the other. As a result, the same position is retrieved irrespective of the retrieval of the time code of either video or digital data signal.

What is claimed is:

1. An apparatus for generating a time code to be inserted into each frame of a first and a second signal recorded in frequency-divided time-multiplex form on a track, said first and second signals being divided respectively into respective frames of unequal, asynchronous lengths, comprising:

first detecting means for detecting frames of said first signal;

first counting means for counting a first number of said frames of said first signal and for incrementing a first time value and for resetting said first number after a count of a predetermined first number;

second detecting means for detecting frames of said second signal;

second counting means for counting a second number of said frames of said second signal and for incrementing a second time value; and correlation means responsive to said resetting of said first counting means for incrementing said second time value and for resetting said second number at a count of said second counting means subsequent to said resetting of said first counting means.

2. An apparatus as recited in claim 1, wherein said first signal is a video signal and said second signal is a digital data signal.

3. An apparatus as recited in claim 1, wherein said first signal is a digital data signal and said second signal is a video signal.

4. A method of generating a first time code to be inserted into each of a plurality of first frames of a first signal and of generating a second time code to be inserted into each of a plurality of second frames of a second signal, said first and second signals being recorded in frequency-division, time-multiplex form on a track and being divided into said first and second frames respectively of unequal asynchronous lengths, said method comprising the steps of:

counting a first number of said first frames, said first time code code comprising a first time and said first number;

count a second number of said second frames, said second time code comprising a second time and said second number;

incrementing said first time in response to said counting of a predetermined one of said first numbers; and incrementing said second time at the beginning of a one of said second frames following said step of incrementing said first time.

* * * * *